United States Patent [19]

Terrell

[11] Patent Number: 4,768,712
[45] Date of Patent: Sep. 6, 1988

[54] SELECTIVE BLENDING AND DISPENSING SYSTEM AND APPARATUS FOR LIQUID FERTILIZERS ON GOLF COURSES

[75] Inventor: B. Joe Terrell, Weimar, Tex.

[73] Assignee: National Turf Systems, Inc., Stafford, Tex.

[21] Appl. No.: 36,804

[22] Filed: Apr. 10, 1987

[51] Int. Cl.[4] ............................................. A01G 25/00
[52] U.S. Cl. ...................................... 239/68; 239/337; 222/395; 137/624.12; 137/624.14
[58] Field of Search ................................. 239/67–70, 239/310, 312, 313, 317, 323, 66, 148, 10, 337; 222/345, 386; 137/624.12, 624.14

[56] References Cited

U.S. PATENT DOCUMENTS

| | | | |
|---|---|---|---|
| 1,347,520 | 7/1920 | Rasch | 239/322 X |
| 2,618,510 | 11/1952 | Mills | 239/313 X |
| 3,326,232 | 6/1967 | Stamps et al. | 239/310 X |
| 3,464,626 | 9/1969 | Stamps et al. | 239/10 |
| 3,578,245 | 5/1971 | Brook | 239/69 X |
| 4,196,852 | 4/1980 | Thomas | 239/148 X |
| 4,456,176 | 6/1984 | Agins | 239/310 X |

Primary Examiner—Andres Kashnikow
Assistant Examiner—Kevin P. Weldon

[57] ABSTRACT

A selective liquid fertilizer blending system and apparatus associated with golf courses utilizing automatic irrigation systems to irrigate the various species of turf grasses used on fairways, tees, greens and other areas; being adapted to selectively and continuously blend in a "spoon feeding" manner the agronomically correct ratios of liquid fertilizer/irrigation water. The desideratum is a uniformly blended mixture of liquid fertilizer and irrigation water in the agronomically correct spoon-feeding ratios delivered in an aqueous solution to each specific turf grass species used on the separate use areas of the golf course in a continuous manner through sprinkler heads or other irrigation devices. This objective has been found to be obtainable by causing the two liquids to be blended in the proper ratios through the use of individual and separate flow circuits contained in a special valve block, there being a separate flow circuit for each separate turf grass species requiring different fertilizer feeding rates; combined with a stratification pressure vessel, an electrical control block, a monthly use inventory storage vessel; connected to the upstream and downstream ports of an ordinary pressure sustaining valve or differential pressure orifice device as used in the discharge line of a golf course pumping station.

8 Claims, 1 Drawing Sheet

SELECTIVE BLENDING AND DISPENSING SYSTEM AND APPARATUS FOR LIQUID FERTILIZERS ON GOLF COURSES

BACKGROUND OF THE INVENTION

This invention relates to apparatus for controllably blending a continuous stream of small proportionate amount of a first liquid more dense than natural water with a continuous stream of a pumped natural water carrier liquid in such a manner that when the volume of water carrier liquid being pumped is significantly varied, the ratio by volume of first liquid to volume of carrier liquid can be controlled precisely to that ratio predetermined for the particular flow volume of water carrier liquid. More particularly, the present invention relates to a golf course irrigation system using one or more pumps drawing water from a reservoir or well and pumping it through fixed and buried underground pipe lines to pop-up sprinkler or irrigation outlets. More particularly, the present invention relates to apparatus for controllably blending a relatively minute continuous stream of liquid fertilizer of specific gravity greater than 1.15 more or less into a relatively large volume flowing water stream of specific gravity which equals 1.00 more or less; allowing and providing a "spoon feeding" or "syringing" of very small amounts of liquid fertilizer each time irrigation is required on a golf course.

In golf course irrigation systems, the requirement for turf irrigation water is typically supplied by a multiple pump station consisting of one or more synchronous speed electric motors driving turbine or centrifugal pumps and pumping through an automatic pressure reducing and pressure sustaining control valve such as those manufactured and supplied by Cla-Val Co. of Newport Beach, Calif. This particular type of valve automatically performs two important functions. The first function maintains a constant downstream pressure regardless of fluctuating demand. The second function sustains the upstream pressure to a pre-determined minimum. Typically, the automatic control valve is a single seated, hydraulically-operated, pilot-controlled, diaphragm type globe valve.

The control system consists of a reducing control sensitive to down-stream pressure changes, and pressure sustaining control that is sensed to the main valve inlet. The reducing control responds to slight downstream variations in pressure and immediately controls the main valve to maintain the desired downstream pressure. The pressure sustaining control is normally held open by the upstream pressure, but closes if this pressure drops to the control set point. This in turn closes the main valve to sustain the desired upstream pressure. The pressure sustaining and pressure reducing valve, hereinafter called Cla-Val TM, is adjustable to provide a constant downstream flowing line pressure regardless of the pumped inlet volume and pressure. A typical installation may provide a flowing line pressure immediately downstream of the Cla-Val(TM) of 150 psi with the flowing line pressure immediately upstream of the Cla-Val(TM) of 200 psi. The various areas of the golf course to be irrigated typically may consist of separate irrigation zones such as fairways, tees, greens, and green banks which are irrigated separately from the rest of the course in a given irrigation cycle. The fairways consist of much larger area of turf grass as compared to the tees or greens; therefore, it is necessary that a greater water volume be pumped in order to adequately irrigate these larger areas in a given time period. The Cla-Val(TM) is used to provide a more or less constant operating pressure to the various sprinkler heads, and this pressure must be maintained at substantially that operating pressure recommended by the sprinkler manufacturer. These Cla-Val(TM) have been used in this application for many years and their use and application is well known.

In very recent years, in order to reduce electrical energy usage in the pumping of water, variable speed electric motors driving turbine or centrifugal pumps have been utilized. A pressure sensing device is used in the discharge pipe line and is connected to a feed-back electrical control which is used to increase or decrease pump speed to maintain a pre-set desired pressure in the discharge pipe lines. Theoretically, this method eliminates the Cla-Val(TM) and is more cost efficient than the aforementioned system using synchronous speed motors and a Cla-Val(TM).

Golf courses are typically irrigated during those hours when the course is not being used for play and irrigation may be required daily; therefore, available irrigation time is limited and large volumes of water must be pumped in a relatively few hours and usually during the nighttime hours. A frequently used term related to irrigation practices is the "evapotranspiration rate." It is a measure of the total amount of water lost by evaporation from the soil plus the water lost from plants through transpiration. The daily water use rate varies substantially from climatic region to region and to a certain degree from location to location within an individual golf course. Environmental factors controlling the evapotranspiration rate include the solar radiation level, surface temperature, atmospheric humidity, and wind velocity. Evapotranspiration rates are highest on sunny days characterized by high temperature, low relative humidities, and a moderate wind velocity.

In order to provide the greater amount of water volume to irrigate a larger area of the golf course, one or more additional pumps are brought on line. In the case of a typical 18-hole golf course, three pumps of approximately 1100 gpm pumping rate may be used for irrigating the fairways; whereas, only one of these pumps might be used for the tees and perhaps two of these pumps may be used for the greens, since the greens typically consist of a much larger area of turf grass than the tees and are much less area than the fairways. Typically, greens should be irrigated with their specific needs as related to the particular species of turf grass used, soil texture, topography, climatic exposure, evapotranspiration rate, intensity of play traffic, and root zone depth. Generally, high intensity of play necessitates increased irrigation frequency.

Fertilizer typically should be applied to turf grasses as used on golf courses with precise uniformity of distribution, as it relates to water utilization; with the amounts of fertilizer required per unit area varying according to the different types of turf grass species used on fairways, greens, and tees. Precise uniformity of water and fertilizer decreases waste of the expensive fertilizer, prevents burning of the turf grasses, and eliminates unsightly and uneven growth in the golf course turf grasses. Waste is minimized by applying the precise relationship of fertilizer and water on all areas under irrigation. Burns are prevented by applying the agronomically correct formulation of spoon fed fertilizer in all areas, depending upon the type of turf grasses used and the amount of irrigation required to sustain appearance and health of the grasses. Uneven growth and unsightly patches of turf grass are eliminated by precise, agronomically correct formulations of fertilizer applied in very small amounts continuously as irrigation is performed.

Turf grass fertilizers are formulated and manufactured in both granular dry form and liquid form and are readily available to the operators of both public and private golf course facilities. The inadequacies of dry fertilizer application are well known, since its use absolutely requires dissolving it in place by the action of water, which has proven to be very difficult, ineffective, and wasteful of irrigation water.

Further, its use requires a precise distribution method to help prevent the aforementioned problems of waste, burning and uneven growth of the turf grasses; and, this has been proven to be extremely difficult due to the types of equipment and practices used. These problems inherent to the use of dry, granular fertilizer are well known in the industry.

In known liquid fertilizer applications, the fertilizer is pre-mixed in mixing vessels and is sprayed onto the turf grasses by means of tractor pulled spray equipment. This method is labor intensive and causes uneven application of fertilizer because it requires precise control by the operator of the spray equipment; furthermore, during the "watering in" process the ratio relationship of water/fertilizer per treated area is usually disproportionate, thereby resulting in the same problems inherent to the dry fertilizer and water application methods.

Known prior art devices include those disclosed in U.S. Pat. Nos. 3,202,164, 3,421,738, and 4,456,176. U.S. Pat. No. 3,202,164 discloses a chemical additive device which is said to maintain a preselected concentration of additive in the flow line by introducing the additive in quantities which are in direct proportion to the rate of flow of liquid through the line.

U.S. Pat. No. 3,421,738 discloses a mixing arrangement and in particular to an arrangement for mixing two liquid phases, and is said to admix a first liquid phase, obtained by dissolving a soluble particulate material with another liquid phase at a precisely determined ratio.

U.S. Pat. No. 4,456,176 discloses an apparatus consisting of a storage tank and a solution tank arranged so that high pressure water is fed into the top of the storage tank, thus forcing a chemical additive into the solution tank in such a manner as to agitate the water and chemical additive in the solution tank; thence, into irrigation lines by means of a pump.

Thus, a need exists for an effective, non-labor intensive, uncomplicated apparatus which blends an agronomically correct amount of liquid fertilizer into the irrigation water and allows the operator to "spoon-feed" or "syringe feed" his turf grasses continuously as the golf course is irrigated. Moreover, a need exists for apparatus wherein the ratio of continuous flowing volume of liquid fertilizer to the continuous flowing volume of irrigation water can be automatically controlled, at different ratios, regardless of the pumped flow rate of irrigation water. Moreover, a need exists for apparatus wherein the aforementioned ratio can be preset to any desired value by the operator to automatically provide the same or different ratios depending upon the pumped flow rate of irrigation water, and also depending upon the particular areas of the golf course being irrigated at any given time in the daily irrigation cycle. Satisfaction of these needs allows the operator to "spoon-feed" or "syringe-feed" the various turf grass areas of his golf course according to the varying fertilizer and irrigation demands of such area. For example, the operator may wish to apply twice as much fertilizer per unit of irrigation time to the golf course greens, because of the different turf grass species used, as he applies to the fairways; regardless of the pumped flow rate of irrigation water.

SUMMARY OF THE INVENTION

The present invention provides apparatus for use with the irrigation system of a golf course wherein one or more irrigation pumps are used to pump water from a water supply reservoir or well through pipe lines to irrigation sprinkler heads or devices wherein a precise, "spoon feeding", continuous flow of liquid fertilizer is blended into the pumped irrigation water stream at controllable, pre-set ratios regardless of the number of irrigation pumps running (and resulting varying irrigation flow rates) and providing precise liquid fertilizer to irrigation water ratios in the agronomically pre-determined ratios required for the optimum growth, health, and appearance of the different turf grasses used on the greens, tees, fairway grasses and any other specific areas of turf grasses which may differ from these.

DESCRIPTION OF THE DRAWING

The single FIGURE of the drawing, entitled

DESCRIPTION OF THE INVENTION

Figure 1:
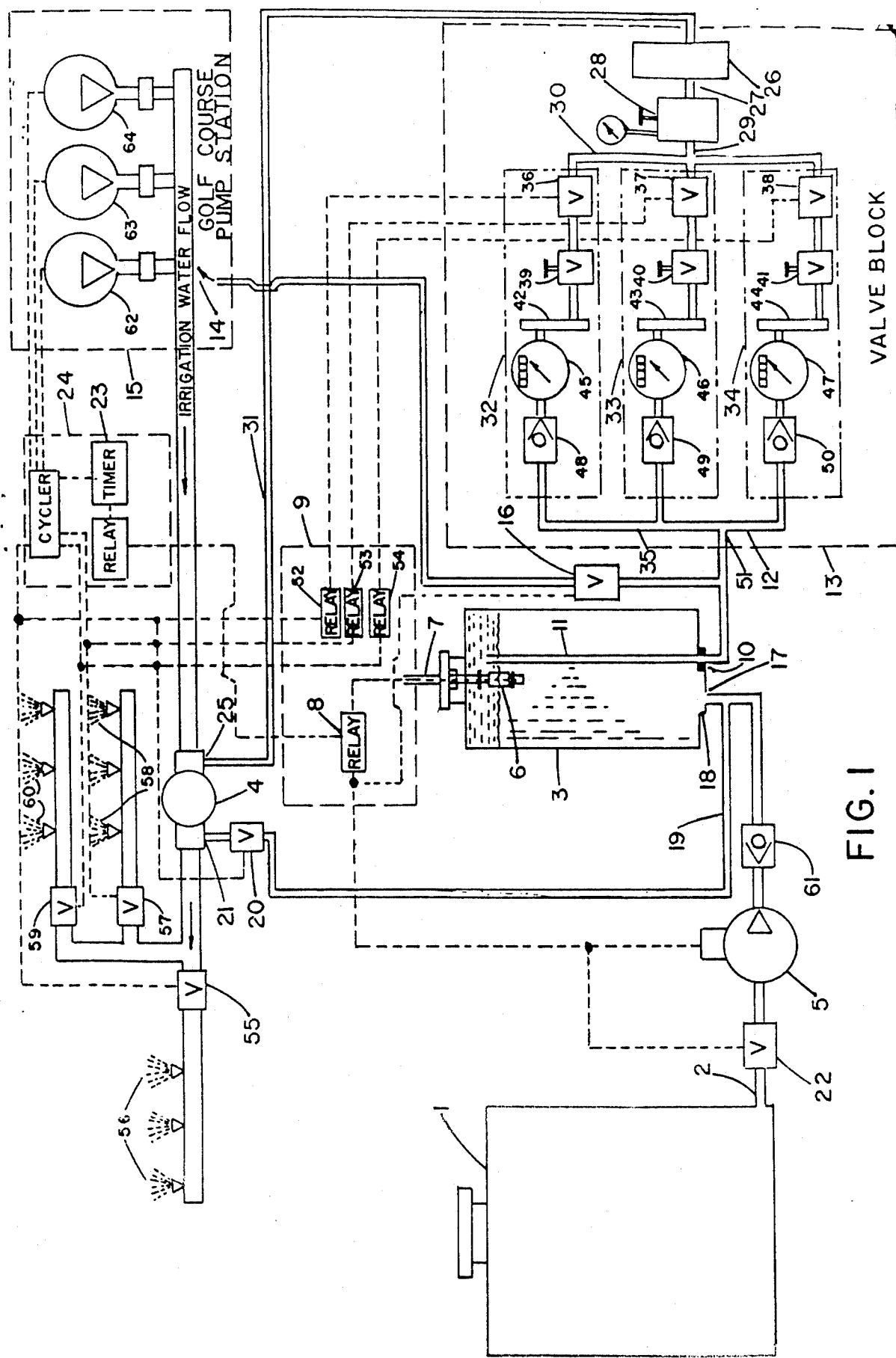
FIG. 1, is a complete flow diagram showing a typical golf course pumping station; one embodiment of its various areas of irrigation; and, one embodiment of the INVENTORY TANK, STRAT TANK, VALVE BLOCK, and CONTROL BLOCK which comprise my invention of a SELECTIVE BLENDING AND DISPENSING SYSTEM AND APPARATUS FOR LIQUID FERTILIZERS ON GOLF COURSES.

The present apparatus includes a sealable storage container 1 hereinafter termed "Inventory Tank", adapted for containing at least one months supply of liquid fertilizer for convenience of inventory control by the operator. Disposed in the container is an outlet conduit 2 adapted to provide a gravity supply of liquid fertilizer on suction demand from a charging pump adapted to fill a second, sealable, vertically disposed stratification pressure vessel 3, hereinafter termed "Strat Tank" with liquid fertilizer.

The Strat Tank 3 usable volume is that volume necessary to provide the proper number of gallons of liquid fertilizer sufficient for one complete irrigation cycle of the golf course, which is considered a daily watering of the various turf grasses in use; wherein the Strat Tank 3 is completely drained of liquid fertilizer at the end of the irrigation cycle. The Strat Tank 3 is a pressure vessel, with operating pressure rating equal to or greater than the preset downstream flowing line pressure of the pressure sustaining and pressure reducing valve 4, hereinafter termed "Cla-Val TM [4], as used by the golf course operator in conjunction with the operation of his irrigation pump station 15. In the preferred embodiment, the Strat Tank 3 is mounted upon a self-contained skid package; such skid package being disposed near the aforementioned Cla-Val TM [4]. In the preferred embodiment of this invention, the Strat Tank 3 is adapted with a small centrifugal type charging pump 5 of such capacity as to take suction from the Inventory Tank 1 and refill the Strat Tank 3 with liquid fertilizer, it being pumped through check valve 61 thence on through the Fertilizer Tube 19 after the irrigation cycle is ended; thus, providing the Strat Tank 3 with a full charge of liquid fertilizer for the irrigation/fertilizing cycle to occur at the next irrigation period.

The Strat Tank 3 is adapted at the upper closure with a float operated magnetic switching device 6; said float being designed to float in the liquid fertilizer of 1.15 to 1.25 specific gravity, but not flotable in the irrigation water. Conduit 7 containing electrical wiring responsive to the magnetic switching device extends from a position approximately six inches below the bottom surface of the top closure of the Strat Tank 3, thence through the top closure, thence into electrical connection with Relay 8. The float containing the magnetic switching device 6 is slidably located on the lower end of said electrical conduit. Such float operated magnetic switching device 6 is commercially available from Transamerica Delaval, Gems Sensors Division, Cowles Road, Plainville, Connecticut. The float operated magnetic switch 6 when closed, makes a circuit with the relay switch 8 located in the external electrical control block 9 hereinafter termed "Control Block", which then provides electrical power to shut off the small, centrifugal type charging pump 5 used to refill the Strat Tank 3 with liquid fertilizer; thus, readying the system for another cycle. The apparatus is prepared to begin fertilizer "spoon feeding" operation in its initial installation by manually operating switch relay 8 in the Control Block 9 to fill the Strat Tank 3 with liquid fertilizer. Thereafter, the system is operated automatically by switches in the Control Block 9.

The Strat Tank 3 is adapted at the lower closure with two tube openings. In one of these openings 10 is disposed a vertical, tubular standpipe extending vertically downward through the lower closure and sealed to prevent internal or external leakage. The tubular standpipe 11, hereinafter termed "Water Tube", extends vertically upward inside the tank with its open end disposed at a level slightly above the uppermost closed switch position of the magnetic float switch device 6. Thus is provided a conduit from the outside, through the bottom closure of the Strat Tank which extends to a point above the liquid fertilizer level at its filled position. The external port of the Water Tube 11 is connected to the discharge irrigation water header 12 of the Valve Block 13, and is also connected to the Golf Course Pump Station 15 suction reservoir 14, through a normally closed solenoid valve 16. The second tube opening 17 in the lower closure 18 extends only to the upper face of the lower closure 18, and passes vertically downward through the lower closure 18; thus providing a second conduit 19, hereinafter termed "Fertilizer Tube", and being sealed from internal or external leakage. In the Fertilizer Tube 19 line run is adapted a normally closed solenoid valve 20 located between the lower Strat Tank closure 18 and the downstream port of the Cla-Val 4; thence, a fluid connection 21 to the downstream side of the Cla-Val 4. Also in the Fertilizer Tube 19 line run is adapted a second normally closed solenoid valve 22 located between the centrifugal pump 5 and the Inventory Tank 1. Also disposed in the Fertilizer Tube 19 and located between the centrifugal pump 5 and the tube opening 18 is check valve 61, which prevents fluid flow from the Strat Tank 3 or the Cla-Val 4 back to the Inventory Tank 1. The normally closed solenoid valve 22 and the centrifugal charging pump 5, as well as the normally closed solenoid valve 16 in the Water Tube 11 connection to the pump station suction reservoir 14, are activated by a timer and relay switch 23 located in the Golf Course Pump Station Cycler Controller 24, thence activating relay 8; said timer switch 23 being activated when the pump station 15 is shut down on completion of an irrigation cycle. Timer switch make time is set for a period of time sufficient to allow the fertilizer charging pump 5 to refill the Strat Tank 3 with liquid fertilizer, and at the same time allowing the irrigation water in the Strat Tank 3 to flow out into the pump station suction reservoir 14.

Discharge of liquid fertilizer from the Strat Tank 3 into the flowing irrigation water stream is accomplished by permitting irrigation water to flow from the upstream port 25 of the Cla-Val 4 through the designated flow circuit, either 32, 33, 34 of the Valve Block 13; thence upward through the Water Tube 11 into the top section of the Strat Tank 3; thus forcing the liquid fertilizer out of the Strat Tank 3 very slowly through the Fertilizer Tube 19, thence into the downstream flow port 21 of the Cla-Val 4. The Valve Block 13 is a group of control devices and monitoring devices suitably connected to the lower end of the Water Tube 11 disposed in the Strat Tank 3. The slow flow rate of the liquid fertilizer results in no commingling of irrigation water and liquid fertilizer because of the difference in fluid densities of the irrigation water and the liquid fertilizer and the very great difference in viscosity of the two interfacing liquids, and the lack of flow turbulence; thus, an effective liquid interface is established, being necessary to the precise nature of this blending apparatus. Flow of irrigation water permitted to pass through the Valve Block 13 is infinitely variable from zero flow up to a typical maximum of 12 gpm in all of the various flow circuits 32, 33, and 34. In a typical golf course irrigation system using three pumps 62, 63 and 64 of 1100 gpm capacity each, the pumped irrigation water flow can be varied from 1100 gpm to 3300 gpm to suit the irrigation requirements and the time allowed for same.

The Valve Block 13 is provided at its entrance with a replaceable element, commercially available, solids filter device 26 in order to clean the irrigation water of all solids which might impede the proper action of the flow circuits 32, 33, and 34 in the Valve Block 13. At the discharge side of the filter 26 is disposed a commercially available pressure reducing and sustaining valve 28 which reduces the flowing line pressure obtained from the upstream port 25 of the Cla-Val 4 flowing through pipe conduit 31 to a pressure approximately equal to 15 psi higher than the flowing line pressure at the downstream port 21 of the Cla-Val 4; this 15 psi differential being sufficient to overcome friction losses in the flow circuits 32, 33, and 34 and the piping into the Strat Tank 3, thence, allowing the irrigation water to enter the Strat Tank and effect the discharge of liquid fertilizer through pipe conduit 19 into the downstream port 21 of the Cla-Val TM [4]. Then, fluidly connected from the discharge side of the pressure reducing and sustaining valve 28 is a pipe conduit 29 coupled into the flow circuits header 30. The Valve Block 13 assembly contains a number of flow circuits 32, 33, and 34, equal to the number of different types of turf grasses and irrigation sprinkler groups 56, 58 and 60 used on the typical golf course described. The Valve Block 13 assembly is adapted to receive cleaned irrigation water from the filter 26 and pass it through its various flow circuits 32, 33, 34, thence to its downstream outlet header 35, thence to the lower end of the Water Tube 11 disposed in the Strat Tank 3. Each flow circuit being identical in its configuration and being fluidly connected internally to the input side of the Valve Block 13 and in fluid communication with the pipe header 30, it being connected fluidly by pipe conduit 29 to the discharge side of the pressure reducing and sustaining valve 28.

Each flow circuit 32, 33, 34 is adapted at its downstream port being fluidly connected to the output pipe header 35 of the Valve Block 13. Normally closed solenoid valves 36, 37, 38 are disposed at the entrances to each of the flow circuits. Immediately downstream the solenoid valves 36, 37, 38 are disposed needle valves 39, 40, 41, each with a threaded stem to allow infinite positioning of the needle in the flow channel, thus enabling the operator to precisely set the proper flow restriction with each needle value 39, 40, 41 that he may read the flow rate of irrigation water through each flow circuit 32, 33, 34 passing through the Rotameters 42, 43, 44, thence into pipe conduits. Immediately downstream the needle valves 39, 40, 41 are fluidly connected the input flow ports of commercially available flow rate metering device commonly termed "Rotameter", 42, 43, 44 disposed in a vertical position, and being calibrated to reveal the flow rate of irrigation water passing through each. At the outlet of each of the Rotameters 42, 43, 44 are fluidly connected commercially available totalizing flowmeters 45, 46, 47, calibrated to display total gallons of irrigation water which has passed through them. At the outlet of each of the totalizing flowmeters 45, 46, 47 are fluidly connected the inlet end of commercially available check valves 48, 49, 50 disposed to prevent flow from any flow circuit of the Valve Block 13 from entering any other flow circuit. The outlet end of each check valve 48, 49, 50 is fluidly connected to flow header 35, thence to the outlet port 51 of the Valve Block 13, thence in fluid connection with Water Tube 11.

Thus, the preceding description of the Valve Block 13 assembly describes the mechanics of pre-setting the desired gallons flow rate of irrigation water which is allowed to pass through each flow circuit; thence, into the Strat Tank 3; thus forcing out of the Strat Tank that flow rate of liquid fertilizer, into the flowing irrigation water, deemed necessary to properly apply the agronomically correct number of pounds of liquid fertilizer per irrigation cycle to the particular turf grass area being irrigated. The totalizing flowmeters 45, 46, 47 allow the operator to visually determine the amount of liquid fertilizer applied during the irrigation cycle to each of the specific areas of turf grass, said specific areas of turf grass each being allocated a particular flow circuit, either 32, 33, or 34 through which it receives its proper liquid fertilizer/irrigation water ratio.

According to the present invention, the flow circuit 32, 33, 34 configurations contained in the Valve Block 13 permit the operator of a golf course irrigation system the complete flexibility of applying precisely the predetermined correct number of pounds of Nitrogen, Phosporus, and Potassium per unit of area to the various turf grasses variously used on the greens, tees, and fairways of his course, and any other particular area on the course using a different species of turf grass. The amounts of liquid fertilizer used on each of the greens, tees, and fairways during each irrigation cycle are displayed on the totalizing flowmeters 45, 46, 47 described in the preceding Valve Block 13 description; providing the operator an updated, running inventory total of applied fertilizer after each irrigation cycle.

Table I presents the liquid fertilizer program for a typical golf course using three pumps 62, 63, 64 in a pump station 15 wherein the operator has agronomically determined that his course fairways require 240 irrigation cycles per year, applying one quarter acre inch of water per cycle; the greens requiring 325 irrigation cycles per year, applying 0.3 acre inches of water per cycle; and the tees requiring 325 irrigation cycles per year, applying 0.2 acre inches of water per cycle. Fairways, tees, and greens each have different types of turf grasses, each of which agronomically requires different amounts of N, P, and K per acre per year for optimum growth and appearance. Also, Table I displays the area in acres of the fairways, tees and greens and the pounds of Nitrogen, Phosporus, and Potassium reqruied per acre for each of these specific turf grass areas. Stipulated is the number of pumps in the golf course pumping station and the pumping capacity of each. From this information, the operator calculates the exact pumping time and volume of water to be pumped to provide the proper amount of irrigation water and then sets each flow circuit 32, 33, 34 in the Valve Block 13 to provide the amount of liquid fertilizer needed for each specific turf grass area during the irrigation cycle of each turf grass area.

TABLE I

TURF GRASS AREAS AND PUMP STATION PUMP CAPACITIES

Acres of Fairways: 78.00; Acres of Tees: 2.50; Acres of Greens: 10.90

Pump #1, 1100 GPM; Pump #2, 1100 GPM; Pump #3, 1100 GPM

FERTILIZER MIXTURE REQUIREMENTS AND YEARLY FEEDING TOTALS

Liquid Fertilizer Mix (N, P, K): 0.16, 0.04, 0.04
Required Pounds N/Acre/Year: Fairways, 250; Tees, 280; Greens, 312

FAIRWAYS, IRRIGATION WATER REQUIREMENTS AND FERTILIZER DISPENSED

Pumps #1, #2, #3 Running; Watering Cycles/Year, 240
Acre/Inches Water Required/Watering Cycle, 0.25
Hours Pump Time: 2.67; Water Pumped: 529,507 Gallons/Cycle
Gallons Liquid Fertilizer/Water Cycle: 49.30
Gallons Liquid Fertilizer Required/Minute: 0.31
Pounds N/Cycle: 81.25; Pounds P/Cycle: 20.31; Pounds K/Cycle: 20.31
Pounds N/Year: 19,500; Pounds P/Year: 4,875; Pounds K/Year: 4,875
Total Volume Irrigation Pumped/Year: 127,081,736 Gallons

TEES, IRRIGATION WATER REQUIREMENTS AND FERTILIZER DISPENSED

Pump #1 Running; Watering Cycles/Year, 325
Acre/Inches Water Required/Watering Cycle, 0.20
Hours Pump Time: 0.21; Water Pumped: 13,577 Gallons/Cycle
Gallons Liquid Fertilizer Required/Water Cycle: 1.31
Gallons Liquid Fertilizer Dispensed/Minute: 0.11

Pounds N/Cycle: 2.15; Pounds P/Cycle: 0.54; Pounds K/Cycle: 0.54

Pounds N/Year: 700; Pounds P/Year: 175; Pounds K/Year: 175

Total Volume Irrigation Pumped/Year: 4,412,560 Gallons

GREENS, IRRIGATION WATER REQUIREMENTS AND FERTILIZER DISPENSED

Pumps #1, #2 Running; Watering Cycles/Year, 325
Acre/Inches Water Required/Watering Cycle, 0.30
Hours Pump Time: 0.67; Water Pumped: 88,794 Gallons/Cycle
Gallons Liquid Fertilizer Required/Water Cycle: 6.35
Pounds N/Cycle: 10.46; Pounds P/Cycle: 2.62; Pounds K/Cycle: 2.62
Pounds N/Year: 3400; Pounds P/Year: 850.2; Pounds K/Year: 850.2
Total Volume Irrigation Pumped/Year: 28,858,142 Gallons

SUMMARY

Liquid Fertilizer Dispensed/Full Daily Irrigation Cycle: 56.96 Gallons
Max. Water Pumped/Full Daily Irrigation Cycle: 631,878 Gallons
Irrigation Water Pumped/Year: 160,352,432 Gallons
Total Liquid Fertilizer Dispensed/Year: 14,320 Gallons, or 73.74 Tons

END TABLE I

It is obvious to one skilled in the art that if a fourth specific turf grass area is present on the golf course and requiring different irrigation rates and fertilizer dispensing rates, such as a driving range, then a fourth flow circuit would be used in the Valve Block; and, if a fifth specific area such as a putting green is present, then a fifth flow circuit would be used in the Valve Block. It is further obvious to one skilled in the art that the logic control of the pump station cycler should be set to change flow circuits in Valve Block 13 at such time previous to completion of the existing fertilizer cycle so as to charge the main pipe line with the next fertilizer/water ratio. This allows continuous operation of the system without purging of the main pipe lines leading to each of the various turf grass areas to be fertilized/irrigated. In the example given in Table 1, it is found that the capacity of the Strat Tank 3 should be at least 60 gallons in order to accommodate the maximum liquid fertilizer usage of 56.96 gallons for a complete daily irrigation cycle. Also, since the typical golf course pump station utilizes pumps of 1100 gpm capacity with discharge pressure capacity of 200 psi, and downstream of the Cla-Val TM [4]the flowing line pressure is typically 150 psi maximum. I have found that the typical Strat Tank 3 working pressure rating should be at least 150 psi. Furthermore, for convenience of the golf course operator, it is found that the capacity of Inventory Tank 1 should be at least 1800 gallons in case fertilizing of all turf grass areas is done each day for a 31 day month; thus, allowing refilling of the Inventory Tank 1 on a monthly basis.

Thus, in the embodiment shown in FIG. 1, in order to provide the most beneficial means of fertilizer feeding of each specific turf grass area; i.e. "spoon feeding" or "syringe feeding", the pump station cycler control circuits 24 are then wired to relays 52, 53, 54 in such a manner that when the fairways are being watered with all three pumps 62, 63, 64 running, the solenoid valve 36 in the fairway flow circuit 32 is energized as is solenoid valve 55, opening the flow circuit 32 that is pre-set for the amount of liquid fertilizer needed for the fairways thus permitting the irrigation water flow from the upstream side of the Cla-Val TM [4]to pass through the Valve Block 13 fairway flow circuit 32, thence into the Strat Tank 3; thus forcing out the liquid fertilizer from the Strat Tank 3, thence into the downstream port 21 or the Cla-Val TM [4]and into the flowing irrigation water stream through valve 55 to the sprinklers 56 in the proper pre-set ratio. In a like manner, when the greens are being irrigated with two of pumps 62, 63, 64 running, the solenoid valve 37 controlling the flow circuit 33 for the greens is energized as is valve 57, opening the valve 37 and permitting the fertilized irrigation water to pass through to sprinklers 58. In a like manner, when the tees are being irrigated with either one pump or two pumps 62, 63, 64 the solenoid valve 38 controlling the flow circuit 34 for the tees is energized as well as valve 59, allowing fertilized irrigation water to flow to sprinklers 60.

In all cases, when the pump station is switched on, a relay in the cycler 24 is energized which opens the solenoid valve 20 disposed in the Strat Tank Fertilizer Tube 19 line, thus permitting the liquid fertilizer egress from the Strat Tank 3, thence into the downstream port 21 of the Cla-Val TM [4]. The electrical techniques described are well known in the industry and are not a part of this invention; but are used as a commercially available state of the art technique; thus, the wiring diagrams for the pump station relays are not made a part of this disclosure.

The invention claimed is:

1. Apparatus for continuously blending a first liquid fertilizer of specific gravity equal to at least 1.15 and not greater than 1.25 with a second carrier liquid of natural water of specific gravity of 1.00 more or less at a predetermined flow rate of first liquid with a predetermined pumped flow rate of second carrier liquid in multiple blending circuits wherein apparatus is used on golf courses where pumped irrigation water through sprinkler heads or other irrigation devices is required on more than one area utilizing different species of turf grasses requiring different amounts of fertilizer per irrigation cycle, and the golf course superintendent operates a pump station utilizing synchronous speed electric motors driving turbine or centrifugal pumps with a pressure reducing and pressure sustaining valve such as the Cla-Val TM in the discharge line of the pump station as part of his operation, comprising;

an inventory tank of storage capacity equal to the greatest monthly usage of liquid fertilizer on the golf course;

a pressure vessel adapted for stratification of the two liquids with rated working pressure at least equal to the maximum flowing line pressure downstream of the pressure reducing and pressure sustaining valve such as the Cla-Val TM, and adapted to receive that flow rate of irrigation water from the upstream port of the pressure reducing and pressure sustaining valve such as the Cla-Val TM which equals the required flow rate of liquid fertilizer to be blended with the flowing irrigation water downstream of the pressure reducing and pressure sustaining valve such as the Cla-Val TM; said stratification providing the irrigation water lying on top of the liquid fertilizer and providing an interface between the two liquids, preventing commingling of the two liquids;

a valve block comprising a number of flow circuits, equal in number to the number of different species of turf grasses used on the golf course and each of which require different fertilizer/water ratios, each flow circuit being adapted to regulate that flow rate of irrigation water permitted to flow through the flow circuit and thence into the pressure vessel adapted for stratification of the two liquids; said flow rate to be equal to the required flow rate of liquid fertilizer to be blended with the flowing irrigation water downstream of the pressure reducing and pressure sustaining valve such as the Cla-Val TM in a pre-determined ratio of fertilizer to water depending upon the fertilizer requirements of the particular turf grass area for which the flow circuit is utilized; the said irrigation water then forcing the liquid fertilizer out of the stratification pressure vessel into the downstream port of the pump station pressure reducing and pressure sustaining valve such as the Cla-Val TM and thereby blending it with the flowing irrigation water on a continuous basis, and providing accurate and precise continuous flowing fertilizer/water ratios;

an electrical control block which is adapted to operate solenoid valves which control the utilizing of each of the multiple flow circuits in the valve block, affording electrical selection of the flow circuit to be utilized.

2. The apparatus according to claim 1 wherein said inventory tank is adapted with a solenoid valve operated suction line adapted with a check valve downstream of the solenoid valve positioned to permit flow of liquid fertilizer only out of the inventory tank.

3. The apparatus according to claim 1 wherein said stratification pressure vessel is provided with a charging pump taking suction from the suction line of the inventory tank and adapted to fill the stratification pressure vessel with liquid fertilizer and adapted to discharge the irrigation water remaining in the stratification pressure vessel into the pump station suction reservoir, when refilling of liquid fertilizer takes place.

4. The apparatus according to claim 1 wherein said valve block is provided with a solids filter to filter solids from the irrigation water flowing from the upstream port of the pressure sustaining valve in the pump station discharge line; a pressure reducing and pressure sustaining valve to regulate the pressure flowing through the valve block to that amount equal to approximately 15 psi higher than the downstream flowing line pressure of the pump station pressure sustaining and pressure reducing valve such as the Cla-Val TM; each flow circuit of which is provided with a manually adjustable flow restrictor to limit the amount of water flowing through; downstream the flow restrictor a flow rate meter to visually indicate the flow rate of the water flowing through; downstream the flow rate meter a totalizing flow meter to indicate the total gallons of water which has passed through the flow circuit; and downstream the totalizing flow meter a check valve to prevent backflow from any other flow circuit from entering; each flow circuit connected to the water tube input line which is connected to the top section of the stratification pressure vessel.

5. Apparatus for continuously blending a first liquid fertilizer of specific gravity equal to at least 1.15 and not greater than 1.25 with a second carrier liquid of natural water of specific gravity of 1.00 more or less at a predetermined flow rate of first liquid with a predetermined pumped flow rate of second carrier liquid in multiple blending circuits wherein apparatus is used on golf courses where pumped irrigation water through sprinkler heads or other irrigation devices is required on more than one area utilizing different species of turf grasses requiring different amounts of fertilizer per irrigation cycle, and the golf course superintendent operates a pump station utilizing variable speed electric motors driving turbine or centrifugal pumps, with a pressure sustaining and pressure reducing valve such as the Cla-Val TM in the discharge line of the pump station as part of his operation, comprising;

an inventory tank of storage capacity equal to the greatest monthly usage of liquid fertilizer on the golf course;

a pressure vessel adapted for stratification of the two liquids with rated working pressure at least equal to the maximum flowing line pressure downstream of the pressure sustaining and pressure reducing valve such as the Cla-Val TM, and adapted to receive that flow rate of irrigation water from the upstream port of the pressure sustaining and pressure reducing valve such as the Cla-Val TM which equals the required flow rate of liquid fertilizer to be blended with the flowing irrigation water downstream of the differential pressure orifice device; said stratification providing the irrigation water lying on top of the liquid fertilizer and providing an interface between the two liquids, preventing commingling of the two liquids;

a valve block comprising a number of flow circuits, equal in number to the number of different species of turf grasses used on the golf course and each of which require different fertilizer/water ratios, each flow circuit being adapted to regulate that flow rate of irrigation water permitted to flow through the flow circuit and thence into the pressure vessel adapted for stratification of the two liquids; said flow rate to be equal to the required flow rate of liquid fertilizer to be blended with the flowing irrigation water downstream of the pressure sustaining and pressure reducing valve such as the Cla-Val TM in a pre-determined ratio of fertilizer to water depending upon the fertilizer requirements of the particular turf grass area for which the flow circuit is utilized; the said irrigation water then forcing the liquid fertilizer out of the stratification pressure vessel into the downstream port of the pump station pressure sustaining and pressure reducing valve such as the Cla-Val TM and thereby blending it with the flowing irrigation water on a continuous basis, and providing accurate and precise fertilizer/water continuous flowing ratios;

an electrical control block which is adapted to operate solenoid valves which control the utilizing of each of the multiple flow circuits in the valve block, affording electrical selection of the flow circuit to be utilized.

6. The apparatus according to claim 5 wherein said inventory tank is adapted with a solenoid valve operated suction line adapted with a check valve downstream of the solenoid valve positioned to permit flow of liquid fertilizer only out of the inventory tank.

7. The apparatus according to claim 5 wherein said stratification pressure vessel is provided with a charging pump taking suction from the suction line of the inventory tank and adapted to fill the stratification pressure vessel with liquid fertilizer and adapted to discharge the irrigation water remaining in the stratification pressure vessel into the pump station suction reservoir, when refilling of liquid fertilizer takes place.

8. The apparatus according to claim 5 wherein said control block is provided with a solids filter to filter solids from the irrigation water flowing from the upstream port of the pressure reducing and pressure sustaining valve such as the Cla-Val TM device in the pump station discharge line; a pressure reducing and sustaining valve to regulate the pressure flowing through the valve block to that amount equal to approximately 15 psi higher than the downstream flowing line pressure of the pump station pressure reducing and pressure sustaining valve such as the Cla-Val TM; each flow circuit of which is provided with a manually adjustable flow restrictor to limit the amount of water flowing through; downstream the flow restrictor a flow rate meter to visually indicate the flow rate of the water flowing through; downstream the flow rate meter a totalizing flow meter to indicate the total gallons of water which has passed through the flow circuit; and downstream the totalizing flow meter a check valve to prevent backflow from any other flow circuit from entering; each flow circuit connected to the water tube input line which is connected to the top section of the stratification pressure vessel.

* * * * *